(12) United States Patent
Qian et al.

(10) Patent No.: US 10,289,200 B2
(45) Date of Patent: May 14, 2019

(54) FORCE INDICATION OF A BOUNDARY

(71) Applicant: LENOVO (Singapore) PTE. LTD., New Tech Park (SG)

(72) Inventors: Ming Qian, Cary, NC (US); Scott Edwards Kelso, Cary, NC (US); John Weldon Nicholson, Cary, NC (US); Steven Richard Perrin, Raleigh, NC (US)

(73) Assignee: Lenovo (Sinapogre) PTE. LTD., New Tech Park (SG)

( * ) Notice: Subject to any disclaimer, the term of this patent is extended or adjusted under 35 U.S.C. 154(b) by 0 days.

(21) Appl. No.: 15/480,144

(22) Filed: Apr. 5, 2017

(65) Prior Publication Data

US 2017/0205884 A1 Jul. 20, 2017

Related U.S. Application Data

(63) Continuation of application No. 14/625,379, filed on Feb. 18, 2015.

(51) Int. Cl.
*G06F 3/01* (2006.01)
*G06F 3/033* (2013.01)
*G06F 3/0481* (2013.01)
*G06F 1/16* (2006.01)

(52) U.S. Cl.
CPC .............. *G06F 3/016* (2013.01); *G06F 1/163* (2013.01); *G06F 3/033* (2013.01); *G06F 3/04812* (2013.01); *G06F 2203/014* (2013.01)

(58) Field of Classification Search
CPC .... G06F 3/016; G06F 1/163; G06F 2203/014; G06F 2203/013; G06F 3/011; G06F 3/03545; G06F 1/1684; G06F 2203/04101; G06F 3/017; G06F 3/0362; G06F 3/0412; G06F 3/0433; G06F 3/0436; G06F 3/04815; G06F 3/04842; A63F 13/285; A63F 13/06; A63F 13/245; A63F 13/807; A63F 13/816; A63F 2300/1043; A63F 2300/1062; A63F 2300/8005
See application file for complete search history.

(56) References Cited

U.S. PATENT DOCUMENTS

| | | | |
|---|---|---|---|
| 5,929,840 A | 7/1999 | Brewer et al. | |
| 5,973,689 A | 10/1999 | Gallery | |
| 6,243,078 B1 | 6/2001 | Rosenberg | |
| 2002/0024501 A1 | 2/2002 | Shalit | |
| 2002/0149561 A1 | 10/2002 | Fukumoto et al. | |
| 2003/0067438 A1* | 4/2003 | Chen | G06F 3/03545 345/156 |
| 2011/0141052 A1 | 6/2011 | Bernstein et al. | |
| 2012/0232780 A1* | 9/2012 | Delson | A63F 13/06 701/400 |

(Continued)

OTHER PUBLICATIONS

Jun Rekimoto, "SIGGRAPH 2014—Traxion, Emerging Technologies Contributor", Youtube, https://www.youtube.com/watch?v=kohAV1SJbyY, Aug. 20, 2014.

*Primary Examiner* — Koosha Sharifi-Tafreshi
(74) *Attorney, Agent, or Firm* — Kunzler Bean & Adamson

(57) ABSTRACT

For force identification of a boundary, code detects an attention area on a display intersecting a boundary of the display. In addition the code provides a force indication through a feedback device in response to detecting the attention area intersecting the boundary.

18 Claims, 10 Drawing Sheets

(56) References Cited

U.S. PATENT DOCUMENTS

2014/0306891 A1* 10/2014 Latta ...................... G06F 3/017
345/158
2015/0035749 A1* 2/2015 Nakagawa ............ G06F 3/1423
345/157
2015/0074564 A1 3/2015 Proctor

* cited by examiner

200

| Boundary Data 205 |
| Boundary Data 205 |
| Boundary Data 205 |
| Boundary Data 205 |
| Default Force Indication 210 |

205

| Boundary ID 235 |
| Boundary Geometry 215 |
| Boundary Buffer Distance 220 |
| Boundary Directionality 225 |
| Boundary Force Indication 230 |

FORCE INDICATION OF A BOUNDARY

FIELD

This is a continuation application of and claims priority to U.S. patent application Ser. No. 14/625,379 entitled "FORCE INDICATION OF A BOUNDARY" and filed on Feb. 18, 2015 for Ming Qian, which is incorporated herein by reference

FIELD

The subject matter disclosed herein relates to force indication and more particularly relates to force indication of a boundary.

BACKGROUND

Description of the Related Art

Electronic devices provide a virtual space for users to interact with data. While interacting with an electronic device, a user's attention area may cross a boundary for the virtual space.

BRIEF SUMMARY

An apparatus for force identification of a boundary is disclosed. The apparatus includes a display, a feedback device, a processor, and a memory. The memory stores code executable by the processor. The code detects an attention area on the display intersecting a boundary of the display. In addition the code provides a force indication through the feedback device in response to detecting the attention area intersecting the boundary. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
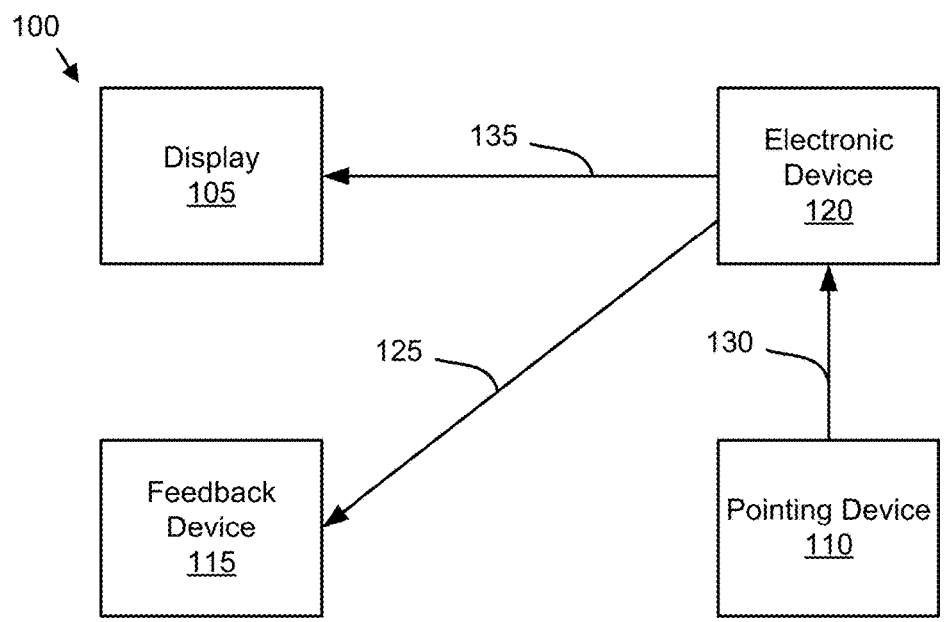
FIG. 1A is a schematic block diagram illustrating one embodiment of a force indication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a force indication system 100. In the depicted embodiment, the system 100 includes a display 105, an electronic device 120, a feedback device 115, and a pointing device 110. The system 100 provides a force indication in response to detecting an attention area intersecting a boundary as will be described hereafter.

The display 105 may be a touch screen display, a monitor, a projected image, or the like. The electronic device 120 may be a computer that is embedded in the display 105. Alternatively, the electronic device 120 may be a computer that communicates with the display 105. In a certain embodiment, the electronic device 120 is a computer workstation, a laptop computer, a tablet computer, a mobile telephone, a server, or the like.

The feedback device 115 may provide a force indication as will be described hereafter. The feedback device 115 may be a tactile actuator. Alternatively, the feedback device 115 may be selected from the group consisting of a piezoelectric actuator, a thermal actuator, and a mechanical actuator.

The pointing device 110 may be a mouse, an electronic pen, an eye tracking device, a motion detector, a video camera, a thermal sensor, or combinations thereof. The pointing device 110 may identify an attention area relative to the display 105 and communicate an attention area position 130 to the electronic device 120.

The electronic device 120 may generate a display signal 135 in response to the attention area position 130 and other inputs for the display 105. The display 105 may show the attention area. For example, the attention area may be a cursor or other indicator on the display 105. Alternatively, the display 105 may reflect the attention area. For example, a visual field of view may be modified to reflect the attention area.

The attention area may be a cursor on display 105. The cursor may be generated by the pointing device 110. Alternatively, the attention area may be a visual area of interest on the display 105. For example, the attention area may be a portion of the display 105 in a user's line of sight. The pointing device 110 may track the user's line of sight to generate the attention area.

In a certain embodiment, the attention area is a physical position of the pointing device 110. For example, the attention area may be a physical position of an electronic pen, a wearable item, or the like.

Alternatively, the attention area may be a physical position of the user. For example, the user may employ gestures and/or motion to interact with the electronic device 120. The attention area may be a position of the user's hand as detected by a video camera pointing device 110. In one embodiment, the attention area is a virtual position of the user. For example, the attention area may be a virtual position in the simulation.

The display 105 may have one or more boundaries. The boundary may be an edge of the display. Alternatively, the boundary may be a limit of a virtual simulation. While interacting with the pointing device 110, a user may generate an attention area that intersects a boundary of the display 105. Intersecting the boundary may include one or more of approaching within a boundary buffer distance of the boundary, crossing the boundary, and/or being located on the boundary.

Intersecting the boundary may diminish the user's ability to interact with the attention area and/or the display 105. For example, the user may be unable to enter data when an attention area such as the cursor intersects a boundary of the display 105. Alternatively, the user may be unable to interact with a simulation when an attention area intersects with the boundary of the display 105.

The embodiments described herein detect the attention area on the display 105 intersecting the boundary of the display 105. In addition, the embodiments provide a force indication through the feedback device 115 in response to detecting the attention area intersecting the boundary. As a result, the user is warned of the attention area intersecting the boundary.

In one embodiment, the electronic device 120 communicates a boundary warning signal 125 to the feedback device 115. The feedback device 115 may provide the force indication in response to the boundary warning signal 125. The boundary warning signal 125 may be a command to provide the force indication. Alternatively, the boundary warning signal 125 may be an asymmetric signal that is applied to the feedback device 115 as will be described hereafter.

Figure 1B:
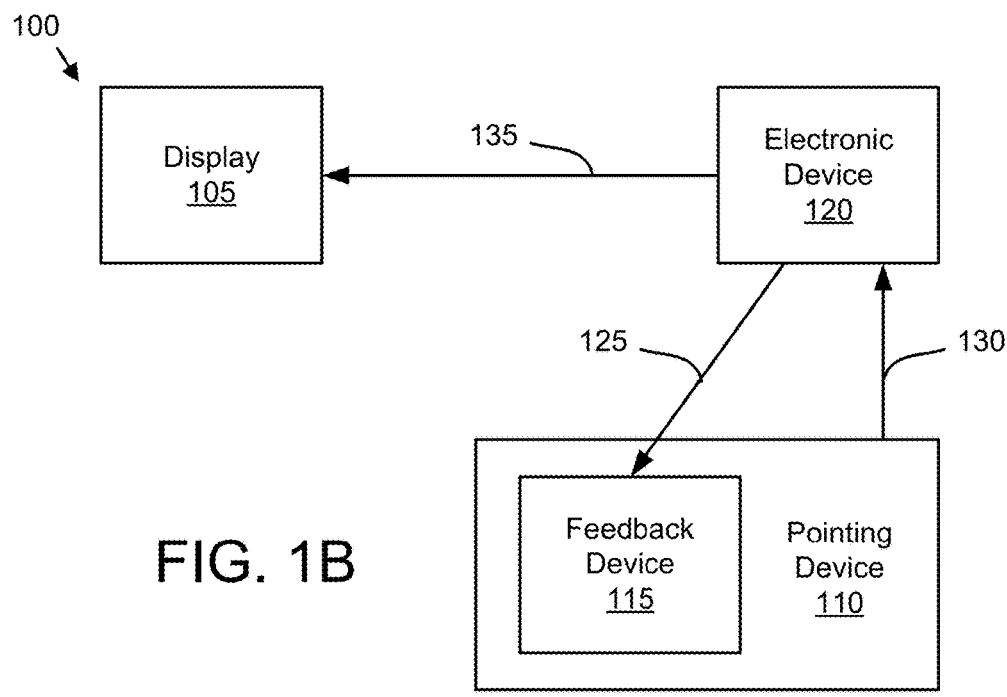
FIG. 1B is a schematic block diagram illustrating one embodiment of a force indication system with embedded feedback device.

FIG. 1B is a schematic block diagram illustrating one embodiment of a force indication system 100 with embedded feedback device 115. In the depicted embodiment, the feedback device 115 is embedded in the pointing device 110. The pointing device 110 may generate the attention area while the feedback device 115 provides the force indication when the attention area intersects the boundary.

Figure 1C:
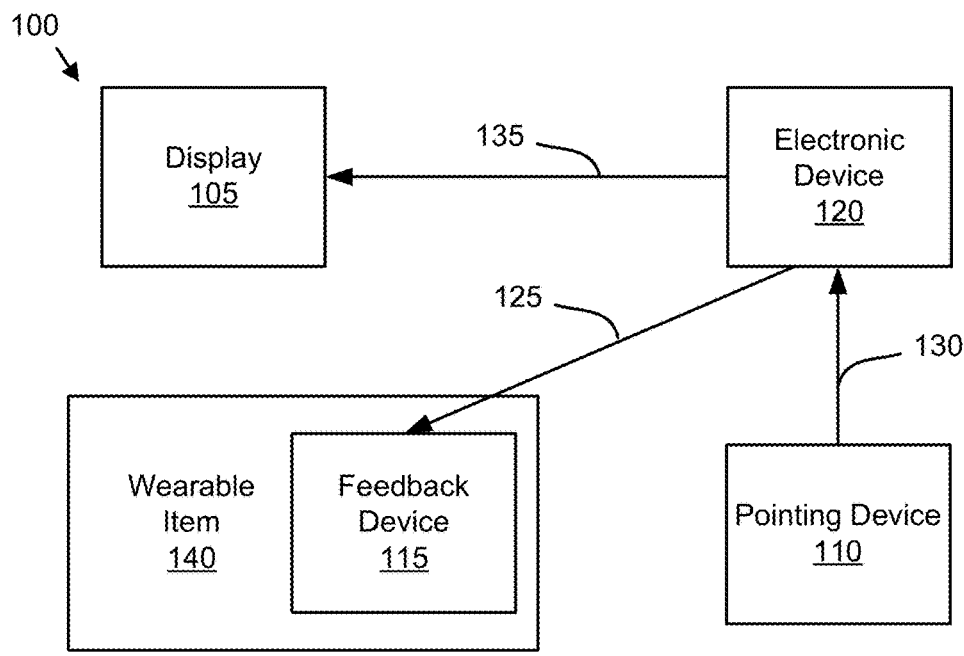
FIG. 1C is a schematic block diagram illustrating one embodiment of a force indication system with a feedback device embedded in a wearable item.

FIG. 1C is a schematic block diagram illustrating one embodiment of a force indication system 100 with the feedback device 115 embedded in a wearable item 140. The wearable item 140 may be clothing, shoes, a watch, a bracelet, a headband, or the like. Multiple feedback devices 115 may be embedded in multiple wearable items 140.

Figure 1D:
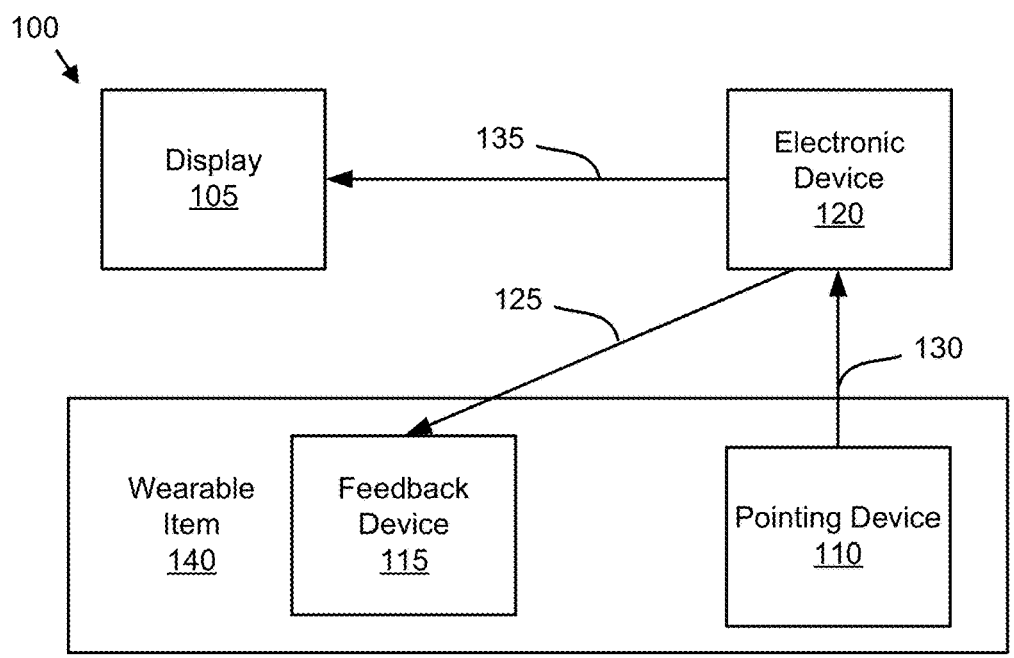
FIG. 1D is a schematic block diagram illustrating one embodiment of a force indication system with the feedback device and pointing device embedded in a wearable item.

FIG. 1D is a schematic block diagram illustrating one embodiment of a force indication system 100 with the feedback device 115 and pointing device 110 embedded in a wearable item 140. The wearable item 140 may be clothing, shoes, a watch, a bracelet, a headband, or the like. The pointing device 110 also allows the wearable item 140 to generate the attention area. Multiple feedback devices 115 may be embedded in multiple wearable items 140.

Figure 1E:
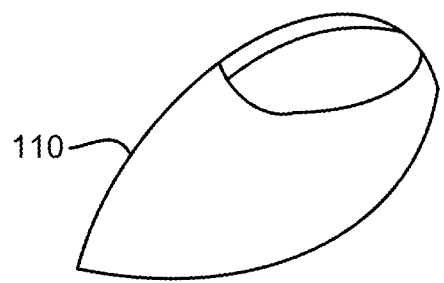
FIG. 1E is a perspective drawing illustrating one embodiment of a mouse pointing device.

FIG. 1E is a perspective drawing illustrating one embodiment of a mouse pointing device 110. The mouse pointing device 110 may generate the attention area position 130. In addition, the feedback device 115 may be embedded in the mouse pointing device 110.

Figure 1F:
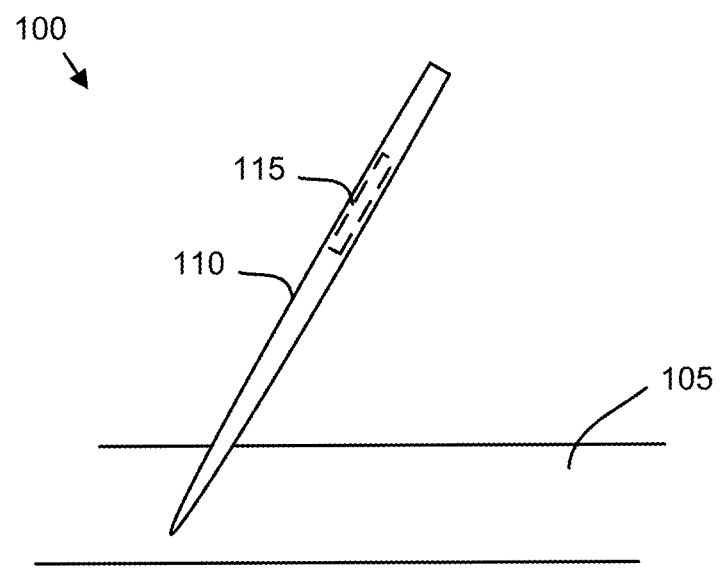
FIG. 1F is a perspective drawing illustrating one embodiment of an electronic pen pointing device.

FIG. 1F is a perspective drawing illustrating one embodiment of an electronic pen pointing device 110. The electronic pen pointing device 110 may interact with the display 105 to generate the attention area position 130. The feedback device 115 may be embedded in the electronic pen pointing device 110.

Figure 1G:
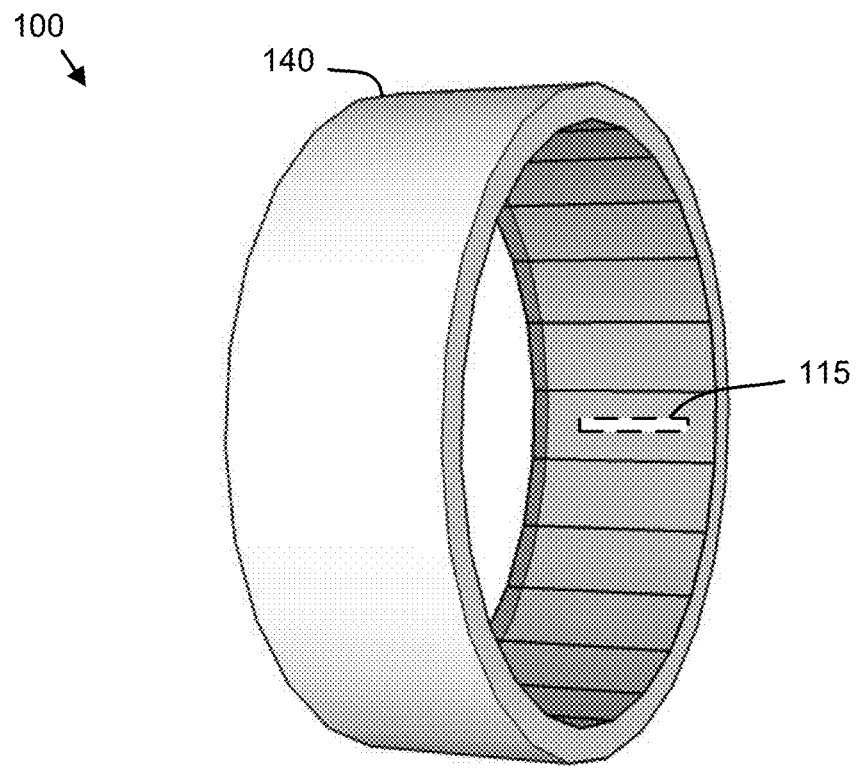
FIG. 1G is a perspective drawing illustrating one embodiment of a bracelet wearable item.

FIG. 1G is a perspective drawing illustrating one embodiment of a bracelet wearable item 140. A motion of the bracelet wearable item 140 may generate the attention area position 130. The feedback device 115 may be embedded in the bracelet wearable item 140. For example, the feedback device 115 may be a thermal actuator that is activated to provide the force indication. Alternatively, the feedback device 115 may be piezoelectric actuator that is activated to provide the force indication.

Figure 1H:
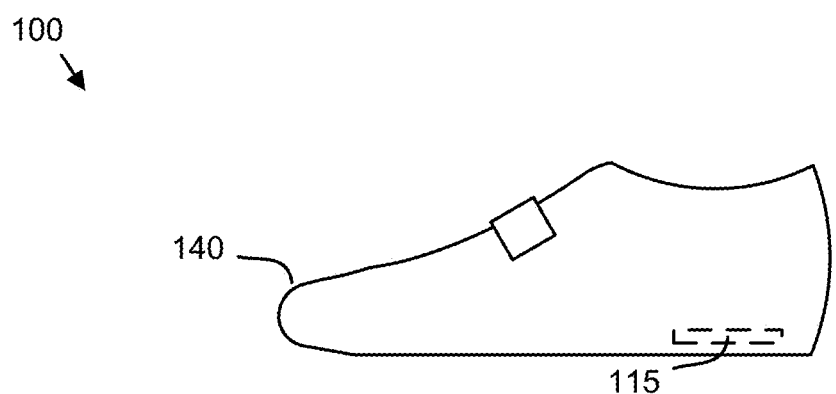
FIG. 1H is a side view drawing illustrating one embodiment of a shoe wearable item.

FIG. 1H is a side view drawing illustrating one embodiment of a shoe wearable item 140. A motion of the shoe wearable item 140 may generate the attention area position 130. For example, the feedback device 115 may be a mechanical actuator that is activated to provide the force indication. Alternatively, the feedback device 115 may be a tactile actuator. In one embodiment, the feedback device 115 stiffens the shoe wearable item 140 using the tactile actuator to provide the force indication.

Figure 2A:
FIG. 2A is a schematic block diagram illustrating one embodiment of display data.

FIG. 2A is a schematic block diagram illustrating one embodiment of display data 200. The display data 200 may describe boundaries for the display 105. The display data 200 maybe organized as a data structure in a memory. In the depicted embodiment, the display data 200 includes boundary data 205 for one or more boundaries as will be described hereafter. The boundary data 205 describes boundary locations and criteria for intersecting the boundary as will be described hereafter.

In addition, the display data 200 may include a default force indication 210. The default force indication 210 may specify the provision of the force indication. The default force indication 210 may be used if no boundary specific force indication is defined.

Figure 2B:
FIG. 2B is a schematic block diagram illustrating one embodiment of boundary data.

FIG. 2B is a schematic block diagram illustrating one embodiment of the boundary data 205. The boundary data 205 maybe organized as a data structure in the memory. In the depicted embodiment, the boundary data 205 includes a boundary identifier 235, a boundary geometry 215, a boundary buffer distance 220, a boundary directionality 225, and a boundary force indication 230.

The boundary identifier 235 may uniquely identify a boundary. The boundary identifier 235 may be a label such as "top."

The boundary geometry 215 may specify a physical and/or virtual location of the boundary. For example, the boundary geometry 215 may specify the virtual location of the boundary relative to pixels of the display 105. Alternatively, the boundary geometry 215 may specify a physical location of the boundary within a room. The attention area may intersect the boundary if the attention area crosses the boundary as specified by the boundary geometry 215. Alternatively, the attention area may intersect the boundary if the attention area is located on the boundary as specified by the boundary geometry 215.

The boundary buffer distance 220 may specify a distance from the boundary geometry 215. The boundary buffer distance 220 may be measured in pixels, centimeters, inches, or the like. The attention area may intersect the boundary if the attention area approaches within the boundary buffer distance 220 of the boundary as specified by the boundary geometry 215.

The boundary directionality 225 may specify which directions of the attention area intersecting the boundary result in providing the force indication. In one embodiment, the boundary directionality 215 indicates that the force indication is provided when the attention area intersects the boundary from inside the boundaries of the display 105. Alternatively, the boundary directionality 215 may indicate that the force indication is not provided when the attention area intersects the boundary from inside the boundaries of the display 105.

In addition, the boundary directionality 215 may indicate that the force indication is provided when the attention area intersects the boundary from outside the boundaries of the display 105. Alternatively, the boundary directionality 215 may indicate that the force indication is not provided when the attention area intersects the boundary from outside the boundaries of the display 105. In one embodiment, the boundary directionality 215 may indicate that the force indication should be provided when the attention area intersects the boundary from either direction.

The boundary force indication 230 specifies the force indication that is provided in response to detecting the attention area intersecting the boundary. The boundary force indication 230 may specify a magnitude of the force indication. In addition, the boundary force indication 230 may specify a direction of the force indication. In one embodiment, the boundary directionality 215 may modify the boundary force indication 230. For example, the boundary force indication 230 may specify a first direction of the force indication when the attention area intersects the boundary from inside the boundaries of the display 105. In addition, the boundary force indication 230 may specify a second opposing direction of the force indication when the attention area intersects the boundary from outside the boundaries of the display 105.

In one embodiment, the boundary force indication 230 specifies the type of force indication. For example, the boundary force indication 230 may specify providing the force indication from an asymmetric signal applied to the feedback device 115 when the attention area intersects the boundary from inside the boundaries of the display 105. In addition, the boundary force indication 230 may specify providing the force indication by stiffening the wearable item 140 when the attention area intersects the boundary from outside the boundaries of the display 105.

Figure 3A:
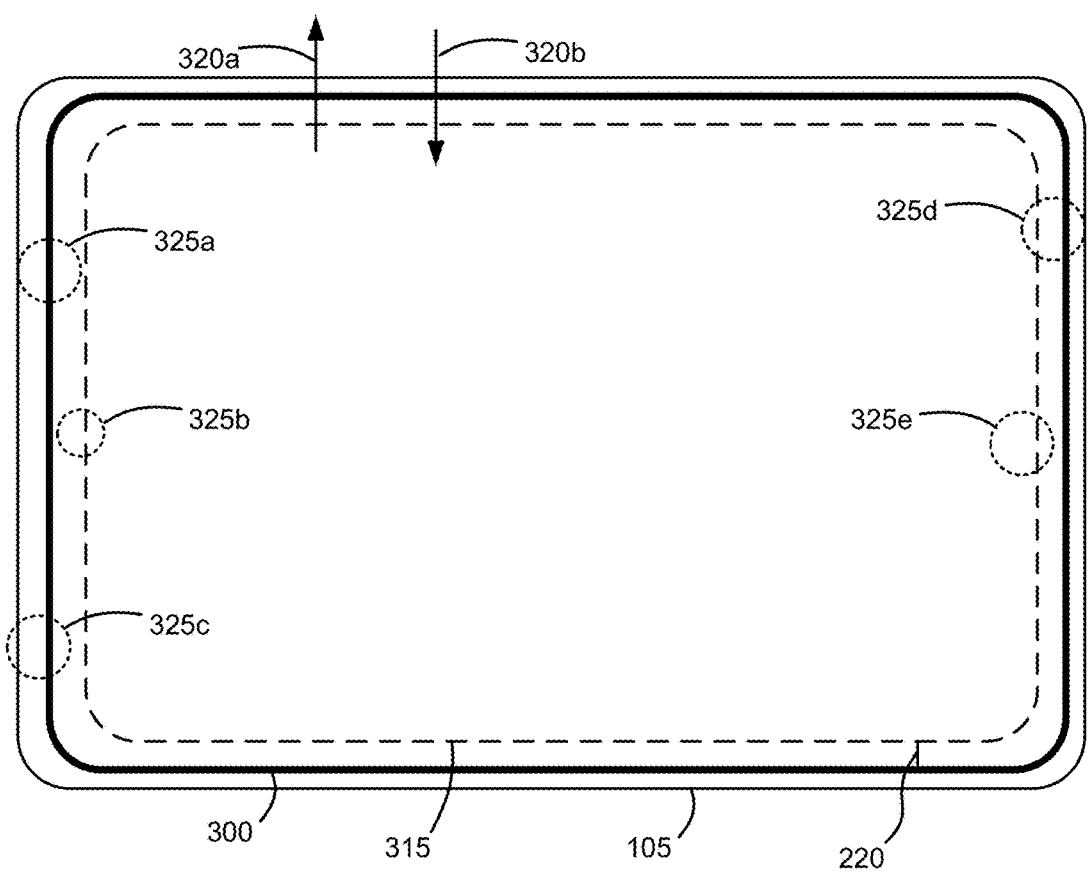
FIG. 3A is a drawing illustrating one embodiment of boundaries.

FIG. 3A is a drawing illustrating one embodiment of boundaries 300 on the display 105. The display 105 is depicted. The display 105 includes a boundary 300. In the depicted embodiment, the boundary 300 is the edge of the display 105. Alternatively, the boundary 300 may be a virtual limit of the simulation depicted within the display 105.

A boundary buffer 315 is also shown. The boundary buffer 315 is the boundary buffer distance 220 from the boundary 300. Intersection directionalities 320 are also shown. A first intersection directionality 320a of crossing from inside the boundaries 300 to outside the boundaries 300 is shown. A second intersection directionality 320b of crossing from outside the boundaries 300 to inside of the boundaries 300 is also shown.

A plurality of attention areas 325 is also depicted. The display 105 may show only one attention area 325. Alternatively, the display 105 may show two or more attention areas 325. For comparison purposes, multiple attention areas 325 are shown on the display.

A first attention area 325a is shown with the center of the first attention area 325a on the boundary 300. An attention area 325c is shown with the center of the third attention area 325c having crossed over the boundary 300. In one embodiment, the center of the attention area 325 must be on and/or cross over the boundary 300 for an intersection of the attention area 325 with the boundary 300.

In a certain embodiment, as illustrated by a fourth attention area 325d, an edge of the attention area 325d has crossed over the boundary 300. The edge of the attention area 325 crossing the boundary 300 may be an intersection of the attention area 325 with the boundary 300. Alternatively, the edge of the attention area 325 crossing the boundary 300 while the center of the attention area 325 does not cross the boundary 300 is not an intersection of the attention area 325 with the boundary 300.

A second attention area 325b is shown with the center of the second attention area 325b having crossed the boundary buffer 315. A fifth attention area 325e is shown with the center of the fifth attention area 325e not having crossed the boundary buffer 315 but an edge of the fifth attention area 325e having crossed the boundary buffer 315. In one embodiment, the center of the attention area 325 must cross the boundary buffer 315 for the attention area 325 to intersect the boundary 300. Alternatively, the edge of the attention area 325 must cross the boundary buffer 315 for the attention area 325 to intersect the boundary 300.

Figure 3B:
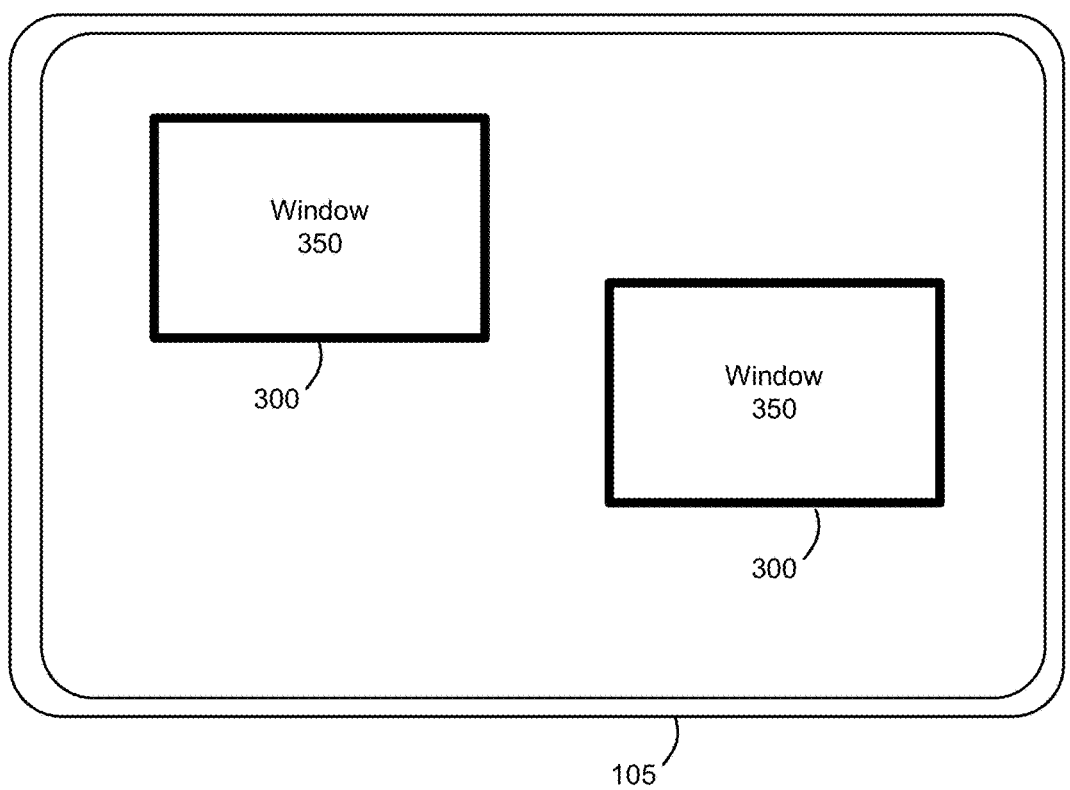
FIG. 3B is a drawing illustrating one alternate embodiment of boundaries.

FIG. 3B is a drawing illustrating one alternate embodiment of boundaries 300 on the display 105. In the depicted embodiment, two graphical user interface (GUI) windows 350 are shown. In one embodiment, the edge of each window 350 is a boundary 300.

Alternatively, edges of elements within a window 350 may be boundaries 300. For example, an edge of a menu bar may be a boundary 300.

Figure 3C:
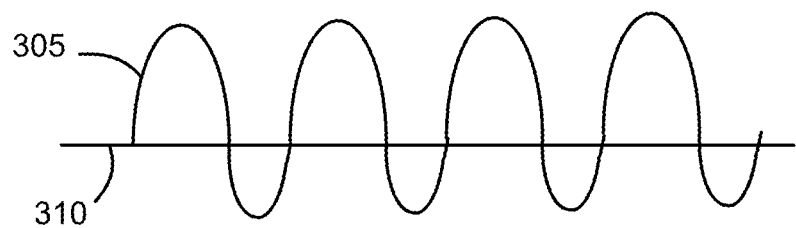
FIG. 3C is a wave form illustrating one embodiment of an asymmetric signal.

FIG. 3C is a wave form illustrating one embodiment of an asymmetric signal 305. The asymmetric signal 305 may be asymmetric relative to a reference value 310. The asymmetric signal 305 may drive an actuator to provide the force indication.

In one embodiment, the effect of the asymmetric signal 305 on the actuator is to generate the simulated force in a direction as the force indication. A user may perceive a force, although the force indication may not produce a net force in any direction, but instead may produce forces that sum to zero force over time.

Figure 3D:
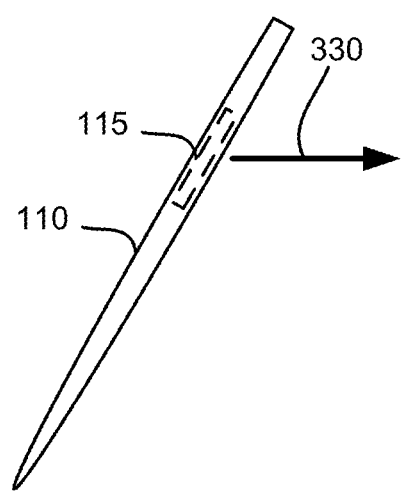
FIG. 3D is a drawing illustrating one embodiment of a force indication.

FIG. 3D is a drawing illustrating one embodiment of a force indication 330. In the depicted embodiment, a feedback device 115 embodied in an electronic pen pointing device 110 generates the force indication 330. The force indication 330 may be in response to the asymmetric signal 305 being applied to an actuator of the feedback device 115.

Figure 4:
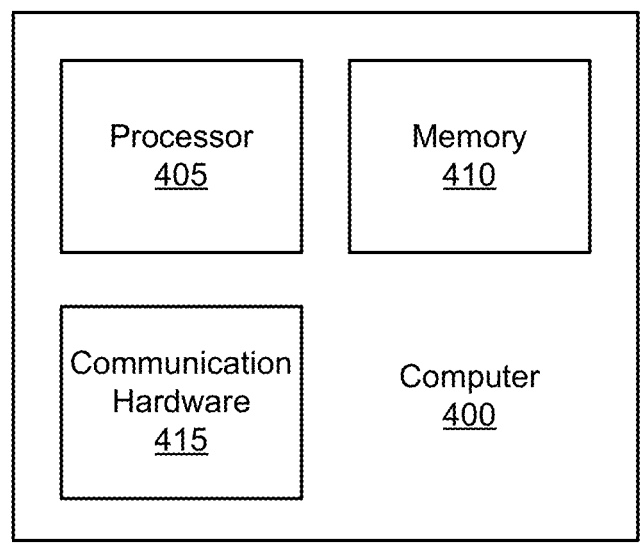
FIG. 4 is a schematic block diagram illustrating one embodiment of a computer.

FIG. 4 is a schematic block diagram illustrating one embodiment of a computer 400. The computer 400 may be embodied in the electronic device 120. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices.

Figure 5:
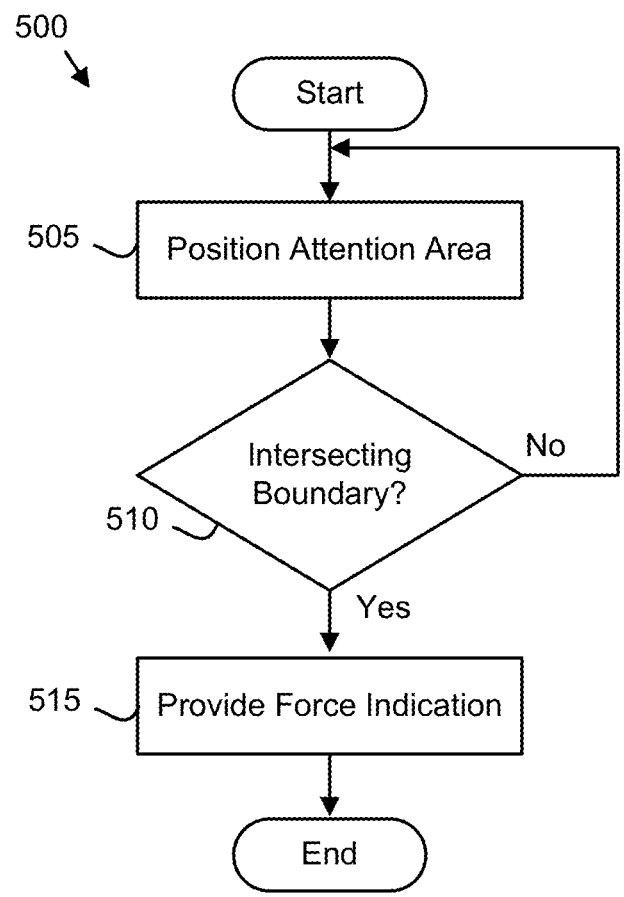
FIG. 5 is a schematic flow chart diagram illustrating one embodiment of a force indication method.

FIG. 5 is a schematic flow chart diagram illustrating one embodiment of a force indication method 500. The method 500 may provide a force indication in response to the attention area 325 intersecting the boundary 300. The method 500 may be performed by the electronic device 120, the display 105, the feedback device 115, pointing device 110 or combinations thereof. The method 500 may further be performed in whole or in part by the processor 405 and/or by computer readable storage medium such as the memory 310 storing code that is executed by the processor 405.

The method 500 starts, and in one embodiment, the code positions 505 the attention area 325 at a physical location and/or logical location of the display 105. In one embodiment, the pointing device 110 communicates the attention area position 130 to the electronic device 120. The code may calculate the attention area 325 and the electronic device 120 may communicate the display signal 135 specifying the attention area 325.

The code may further detect 510 the attention area 325 on the display 105 intersecting a boundary 300 of the display 105. In one embodiment, detecting 510 intersecting the boundary 300 comprises one or more of detecting the attention area 325 approaching within a boundary buffer distance 220 of the boundary 300, detecting 510 the attention area 325 crossing the boundary 300, and detecting 510 the attention area 325 being located on the boundary 300.

In one embodiment, the feedback device 115 only detects 510 the attention area 325 intersecting the boundary 300 if the intersection directionality 320 of the intersection of the attention area 325 and the boundary 300 is specified by the boundary directionality 225. For example, the feedback device 115 may not provide the force indication 330 for and intersection directionality 320b from outside to inside the boundary 300 if the boundary directionality 225 does not specify outside to inside directionality.

If the attention area 325 does not intersect a boundary 300, the code continues to position 505 the attention area 325. If the attention area 325 intersects the boundary 300, the code provides 515 the force indication 330 through the feedback device 115 in response to detecting 510 the attention area 325 intersecting the boundary 300 and the method 500 ends.

By detecting the attention area 325 intersecting the boundary 300 of the display 105 and providing the force indication 330 to the feedback device 115 in response to detecting the attention area 325 intersecting the boundary 300, the embodiments provide feedback to the user when the attention area 325 moves near or outside of the boundaries 300 of the display 105. As a result, the user may correct the positioning of the attention area 325.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
a display;
a feedback device in a wearable item, wherein the wearable item is a shoe;
a processor;
a memory that stores code executable by the processor to:
detect an attention area intersecting a boundary geometry that specifies a physical location of the display, wherein intersecting the boundary geometry comprises approaching within a boundary buffer distance of the boundary geometry; and
provide a force indication by stiffening the feedback device in response to detecting the attention area intersecting the boundary geometry.
2. The apparatus of claim 1, wherein the attention area is a cursor.
3. The apparatus of claim 1, wherein the attention area is a pointing device physical position.
4. The apparatus of claim 1, wherein the attention area is one or more of a visual area of interest, a pointing device virtual position, and a user position.
5. The apparatus of claim 1, wherein an electronic pen that generates the attention area.
6. The apparatus of claim 1, wherein the feedback device is selected from the group consisting of a piezoelectric actuator and a mechanical actuator.
7. A method comprising:
detecting, by use of a processor, an attention area intersecting a boundary geometry that specifies a physical location of the display, wherein intersecting the bound- ary geometry comprises approaching within a boundary buffer distance of the boundary geometry; and providing a force indication by stiffening a feedback device in a wearable item in response to detecting the attention area intersecting the boundary geometry, wherein the wearable item is a shoe.

8. The method of claim 7, wherein the attention area is a cursor.

9. The method of claim 7, wherein the attention area is a pointing device physical position.

10. The method of claim 7, wherein the attention area is one or more of a visual area of interest, a pointing device virtual position, and a user position.

11. The method of claim 7, wherein an electronic pen that generates the attention area.

12. The method of claim 7, wherein the feedback device is selected from the group consisting of a piezoelectric actuator and a mechanical actuator.

13. A program product comprising a non-transitory computer readable storage medium that stores code executable by a processor, the executable code comprising code to perform:

detecting an attention area intersecting a boundary geometry that specifies a physical location of the display, wherein intersecting the boundary geometry comprises approaching within a boundary buffer distance of the boundary geometry; and providing a force indication by stiffening a feedback device in a wearable item in response to detecting the attention area intersecting the boundary geometry, wherein the wearable item is a shoe.

14. The program product of claim 13, wherein the attention area is a cursor.

15. The program product of claim 13, wherein the attention area is a pointing device physical position.

16. The program product of claim 13, wherein the attention area is one or more of a visual area of interest, a pointing device virtual position, and a user position.

17. The program product of claim 13, wherein an electronic pen that generates the attention area.

18. The program product of claim 13, wherein the feedback device is selected from the group consisting of a piezoelectric actuator and a mechanical actuator.

* * * * *